United States Patent [19]

Dorsey et al.

[11] 4,220,442

[45] Sep. 2, 1980

[54] PRESS APPARATUS INCLUDING PLUNGER ADJUSTMENT MEANS

[75] Inventors: Robert J. Dorsey; Hideo Okunami, both of Chicago; William T. Savage, Lemont, all of Ill.

[73] Assignee: Wehr Corporation, Milwaukee, Wis.

[21] Appl. No.: 965,782

[22] Filed: Dec. 4, 1978

[51] Int. Cl.² .......... B29C 3/00

[52] U.S. Cl. .......... 425/344; 425/352; 425/406; 425/DIG. 35

[58] Field of Search .......... 425/344, 352, 354, DIG. 35, 425/406

[56] References Cited

U.S. PATENT DOCUMENTS

| | | | |
|---|---|---|---|
| 447,132 | 2/1891 | Hull et al. | 425/344 |
| 447,187 | 2/1891 | Hull et al. | 425/344 |
| 1,017,921 | 2/1912 | Sheckler | 425/352 |
| 3,225,410 | 12/1965 | Boyer | 425/352 |
| 3,784,343 | 1/1974 | Iwasaki | 425/352 |
| 3,923,440 | 12/1975 | Bettonica | 425/352 X |

*Primary Examiner*—Philip Anderson

[57] ABSTRACT

The invention includes apparatus for use in molding refractory material and is useful, for example, in molding bricks and other similar products. The apparatus includes a mold table supported by a plurality of vertical columns, the mold table being supported for translational movement on the columns. The apparatus further includes a mold box supported by the mold table, the mold box including at least one vertical mold cavity having opposite open ends. The apparatus also includes a plunger assembly supported below the mold and including at least one plunger having an end received in the mold cavity. A plunger assembly is also supported above the mold and includes at least one plunger receivable in the mold cavity, the plungers of the opposed plunger assemblies being functional to compress refractory material placed in the mold. To facilitate adjustment of the thickness of the molded products, the plungers are supported by a plurality of readily removable shims, variation of the number and thickness of the shims being functional to modify the relative positions of the plungers.

12 Claims, 2 Drawing Figures

PRESS APPARATUS INCLUDING PLUNGER ADJUSTMENT MEANS

BACKGROUND OF THE INVENTION

The present invention relates to press apparatus and more particularly to presses used in shaping and compressing refractory material in the manufacture of bricks and similar products.

Presses for use in shaping bricks and other refractory material products have commonly included a mold having a number of mold cavities and at least one plunger assembly normally including a plurality of plungers which can be forced into the mold cavities to compress the refractory material placed therein. In the past, changeover of such presses to facilitate manufacture of bricks having an alternative thickness has required removal of each of the individual plungers of each of the plunger assemblies and substitution of new sets of plungers having the required length. Since each of the plunger assemblies generally includes a number of plungers, substantial time and labor has been required during changeover of the presses. Additionally, the prior art presses have required the brick manufacturer to have available a plurality of different sets of plungers, one set for each product thickness.

For illustrations of various other types of press constructions, attention is directed to the following U.S. Pat. Nos.: The Byerlein 1,827,558, issued Oct. 13, 1931; the Dohm 2,850,966, issued Sept. 9, 1958; and the Merker 3,100,438, issued Aug. 13, 1963. Attention is also directed to the Westan 458,650, issued Sept. 1, 1891; the Gaylord 1,179,781, issued July 11, 1876; and the Dooley 178,278, issued June 6, 1876.

SUMMARY OF THE INVENTION

The present invention provides an improved press apparatus for use in forming articles from refractory materials and wherein modification of the press to facilitate variation of the thickness of the molded product is provided.

More specifically, the invention includes apparatus for use in molding compacted refractory material, the apparatus comprising a support structure including a bed, and a first plunger assembly supported by the bed and having at least one plunger, and means for adjusting the spacing between the plunger and the bed. The spacing adjusting means includes at least one shim removably supported between the plunger and the bed. The press apparatus also includes a second plunger assembly having at least one plunger, means for supporting the second plunger assembly in spaced relationship from the bed and including at least one column supported by the bed, and a mold table supported by the column between the plunger assemblies. A mold is also provided, the mold being supported by the mold table between the plunger assemblies, and the mold including a plurality of mold cavities for receiving the plungers, each of the cavities having opposite open ends, one of the open ends positioned to house a plunger of the first plunger assembly and the other of the open ends positioned to house a plunger of the second plunger assembly. The apparatus also provides means for forcing at least one of the plunger assemblies toward the mold box whereby the plungers of the plunger assemblies can compress refractory material contained in the mold cavities.

Another of the features of the invention is the provision in the first plunger assembly of a plunger mounting plate, a plurality of removable shims supported between the bed and the plunger mounting plate, and means for releasably clamping those shims in such relationship.

Another of the features of the invention is the provision in the means for clamping the shims between the plunger mounting plate and the bed of at least one tie rod having one end slidably positioned in a groove in the base plate and an opposite end of the tie rod releasably engaging the plunger mounting plate.

One of the advantages of the apparatus embodying the invention is that the thickness of the bricks or other products formed by the press apparatus can be varied merely by varying the the number or thicknesses of the shims of one or both of the upper and lower plunger assemblies. Accordingly, whereas prior art apparatus require a plurality of separate sets of plungers to facilitate production of articles of varying thickness, the apparatus of the invention requires only two sets of plungers. Additionally, adjustment of the apparatus to facilitate molding of products having alternate thicknesses can be accomplished in less time and with less labor than was required with prior art apparatus because the removable shims make it unnecessary to remove the individual plungers from the upper and lower plunger assemblies.

Other features and advantages of the invention will become known by reference to the following description, to the appended claims, and to the drawings.

DESCRIPTION OF THE PREFERRED EMBODIMENT

Figure 1:
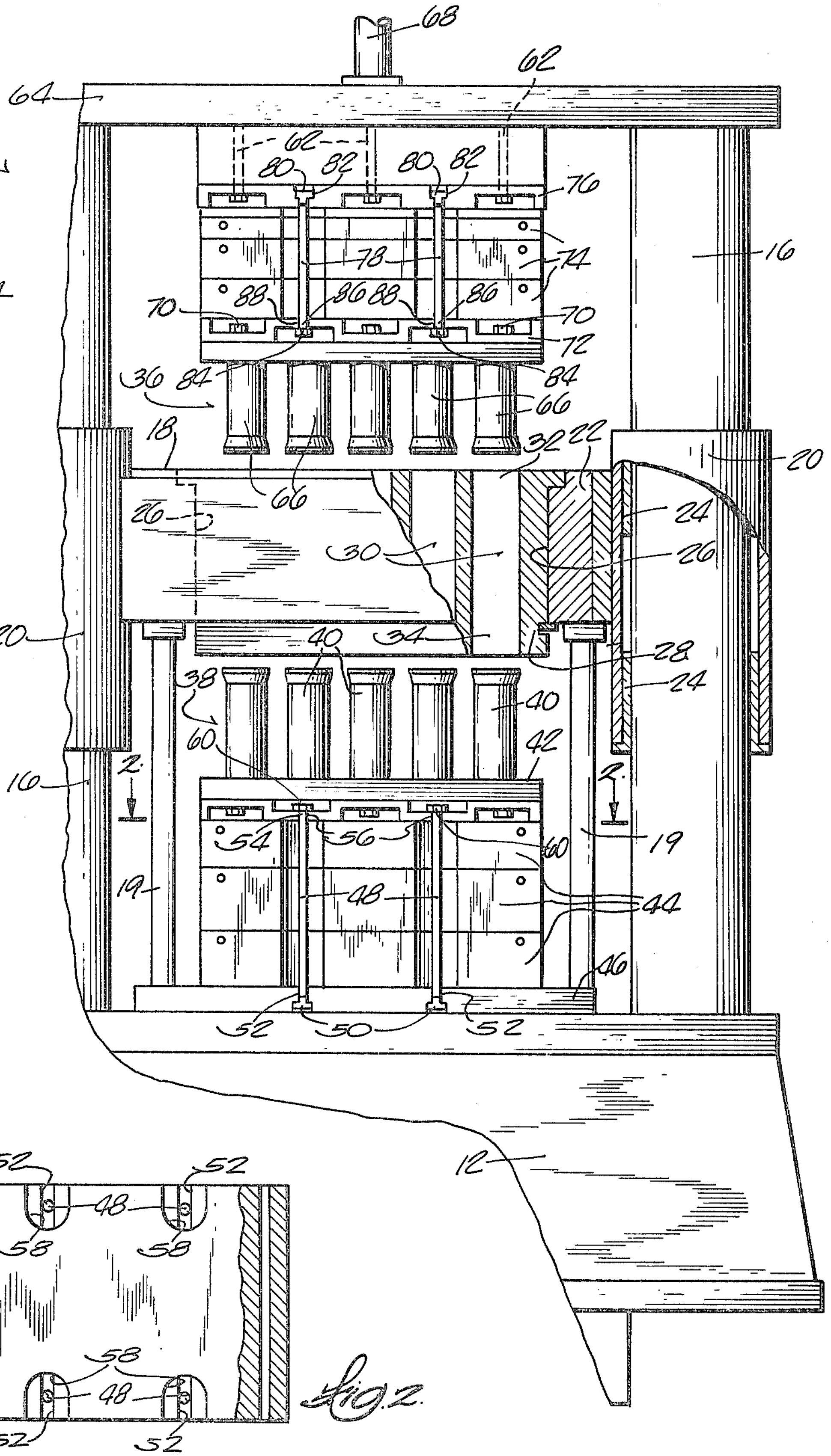
FIG. 1 is a partial elevation view of a refractory press embodying the present invention.

Illustrated in FIG. 1 is a press 10 for use in compressing refractory material and for forming bricks and the like. The press 10 generally includes a bed 12 functioning as a rigid supporting structure and a frame assembly including a plurality of parallel vertical columns or tie bars 16. The press 10 further includes a mold table 18 supported by the tie bars 16 for slidable movement on the tie bars 16 in the direction of their longitudinal axes. The mold table 18 generally includes a plurality of spaced apart sleeves 20 slidably supported on the tie bars 16 and supporting a frame 22 therebetween. The sleeves 20 each include a pair of spaced apart cylindrical bearings 24 therein in sliding contact with the tie bars 16 to facilitate sliding movement of the mold table 18 with respect to the tie bars 16. Means are also provided for causing vertical movement of the mold table 18 including hydraulic pistons 19 connected at their ends to the mold table. The mold table frame 22, rigidly supported between the sleeves 20, has a generally rectangular configuration and includes a central cavity 26 housing a mold 28. The mold 28 includes a plurality of parallel vertical mold cavities 30 therein, the mold cavities 30 intended to receive the refractory material to be molded and each including upper and lower openings 32 and 34, respectively. The refractory material housed in the mold cavities is intended to be compressed by upper and lower plunger assemblies 36 and 38, respectively, to form "green" bricks or the like.

The lower plunger assembly 38 is generally mounted on the bed 20 between the tie bars 16 and includes a plurality of parallel, spaced plungers 40 extending upwardly and intended to be received within the lower openings 34 of the mold cavities 30. The plunger assembly 38 also includes a plunger mounting plate 42 for rigidly supporting the plungers 40, and means for varing the vertical position of the plungers 40. The means for varing the vertical position of the plungers 40 of the lower plunger assembly 38 includes a plurality of generally planar shims 44 positioned in vertically stacked relationship between the plunger mounting plate 42 and a plunger assembly base plate 46 which is in turn supported by the upper surface of the bed 12. By varying the number of the shims 44 positioned between the base plate 46 and the plunger mounting plate 42 or by varying the thicknesses of those shims 44 employed, it is possible to vary the relative vertical position of the plungers 40 and thereby control the resultant thickness of the product molded in the mold cavity.

Figure 2:
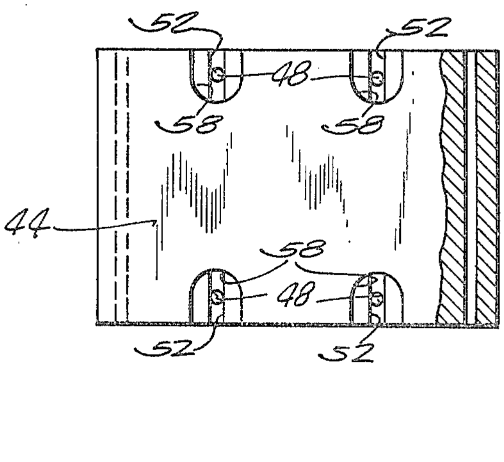
FIG. 2 is a cross section taken along line 2—2 in FIG. 1.

Means are also provided for releasably clamping one or more shims 44 in stacked relationship between the plunger mounting plate 42 and the base plate 46. While various arrangements can be provided, in the illustrated construction, the clamping means includes a plurality of elongated tie rods 48 including heads 50 at their lower ends, the heads 50 being slidably housed within T-shaped slots 52 in the base plate 46. The T-shaped slots 52 in the base plate 46 prevent upward vertical movement of the tie rods 48 yet permit the tie rods 48 to be easily removed by sliding them out of the slots 52. The opposite end 54 of each of the tie rods 48 is threaded and can be received in slots 56 formed in the plunger mounting plate 42. As shown in FIG. 2, shims 44 are also provided with U-shaped notches 58 cut in thin peripheral edges and for receiving the tie rods 48. The threaded ends 54 of the tie rods 48 support nuts 60 whereby the plunger mounting plate 42 can be clampingly secured against the upper shim 44 to thereby clamp the shims 44 against the base plate 46.

In operation, variation of the vertical position of the plungers 40 of the lower plunger assembly 38 can be accomplished by loosening or removing the nuts 60 on the threaded ends of the tie rods 48, thereby permitting the tie rods to be slidably removed from the respective slots 58 and 52 in the plunger mounting plate 42 and in the base plate 46. The mounting plate 42 and plungers 40 can then be removed and shims 44 having a suitable vertical stacked height can then be conveniently substituted. The plunger mounting plate 42 can then be clamped against the replacement shims 44 by longer or shorter tie rods 48 as required.

The upper plunger assembly 36 of the press 10 embodying the invention generally includes a base plate 76 rigidly secured by bolts 62 to a crosshead 64, the crosshead 64 in turn supported for vertical slidable movement on the tie bars 16. Means are also provided for causing vertical slidable movement of the crosshead 64 on the tie bars 16 to provide for downward movement of the plungers 66 of the upper plunger assembly 36 whereby those plungers can be received in the mold cavities 30 of the mold 28 to compress refractory material therein. The means for causing downward movement of the crosshead 64 is illustrated in FIG. 1 as including a hydraulic piston 68. Other conventional press mechanisms or hydraulic clamping apparatus could also be used to cause movement of the crosshead 64.

The plungers 66 of the upper plunger assembly 36 are rigidly attached by bolts 70 to an upper plunger mounting plate 72. A plurality of shims 74 are disposed between the upper plunger mounting plate 72 and the base plate 76, the shims 74 providing means for varying the vertical distance between the plungers 66 and the crosshead 64 and thereby providing for variation in thickness of the product resulting from compression of a refractory material in the mold cavities 30.

Means are also provided for clamping one or more of the shims 74 in place between the base plate 76 and the upper plunger mounting plate 72. As with the lower plunger assembly 38, in the illustrated construction, the clamping means includes a plurality of tie bars 78 each having heads 80 slidably received in T-shaped grooves 82 in the base plate and nuts 84 threadably mounted on a threaded opposite end 86 of the tie rods 78 and received in slots 88 in the mounting plate.

In operation, as with the lower plunger assembly 38, the vertical position of the upper plunger assembly plungers 66 can be conveniently varied by merely substituting shims 74 having varying thicknesses, as shown in FIG. 1, or an alternative number of shims 74 between the plunger mounting plate 72 and the base plate 76.

One of the advantages of the construction of the invention is that the thickness of the bricks or other products formed by the press apparatus can be varied merely by varying the number or thickness of the shims of one or both of the upper and lower plunger assemblies. Accordingly, whereas prior art apparatus require a plurality of separate sets of plungers to facilitate forming compressed refractory material articles of varying thicknesses, the apparatus of the invention requires only two sets of plungers. Additionally, adjustment of the apparatus to facilitate molding of varied products can be accomplished in less time and with less labor than was required with prior art apparatus because the removable shims make it unnecessary to remove the individual plungers from the upper and lower plunger assemblies.

Various of the features of the invention are set forth in the following claims.

We claim:

1. Apparatus for use in molding compacted refractory material, the apparatus comprising:
   - a support structure including a bed,
   - a first plunger assembly including a plunger supporting member, at least one plunger fixedly secured to said plunger supporting member, means for adjusting the spacing between said plunger supporting member and said bed, said spacing adjusting means including at least one removable shim, said shim being selectively removable whereby the spacing between said plunger and said bed can be varied, and means for releaseably clamping said removable shim between said plunger supporting member and said bed,
   - a second plunger assembly including at least one plunger,
   - means for supporting said second plunger assembly in spaced relation from said bed, said supporting means including at least a pair of spaced parallel columns supported by said support structure,
   - a mold table supported by said columns between said plunger assemblies,
   - a mold box supported by said mold table between said plunger assemblies, said mold box including at least one mold cavity for receiving said plungers, said mold cavity having opposite open ends, one of said open ends positioned to house said plunger of said first plunger assembly and the other of said open ends positioned to house said plunger of said second plunger assembly, and means for forcing at least one of said plunger assemblies toward said mold box whereby said plungers can compress refractory material contained in said mold cavities.

2. Apparatus as set forth in claim 1 wherein said plunger assemblies each include a plurality of vertically extending generally parallel, spaced plungers, said plungers of one of said plunger assemblies being in longitudinal alignment with said plunger of the other of said plunger assemblies.

3. Apparatus as set forth in claim 1 wherein said means for supporting said second plunger assembly includes a crosshead supported by said columns for movement toward and away and from said mold table and said bed.

4. Apparatus as set forth in claim 3 wherein said crosshead includes a lower surface, and wherein said second plunger assembly includes a plurality of plungers supported by said crosshead and in spaced relation from said lower surface, and means for adjusting the spacing between said plungers and said lower surface, said spacing adjusting means including a plurality of planar shims positioned between said plungers and said lower surface and means for releaseably securing said shims therebetween.

5. Apparatus as set forth in claim 1 wherein said means for clamping includes at least one tie rod releaseably clamping said shim between said plunger supporting member and said bed.

6. Apparatus as set forth in claim 5 wherein said first plunger assembly includes a base plate secured to said bed and supporting said shim, and wherein said base plate includes a groove therein, said groove including a shoulder, and wherein said tie rod includes an end slidably positioned in said groove and engaging said shoulder, and an opposite end releaseably engaging said supporting member.

7. Apparatus as set forth in claim 1 wherein said spacing adjusting means includes a plurality of shims in vertically stacked relation, said shims each comprising a planar metal plate and being releaseably clamped between said supporting member and said bed.

8. Apparatus for use in molding compacted refractory material, the apparatus including, a support structure including a bed, a crosshead, means for supporting said crosshead in spaced relation from said bed and for movement toward and away from said bed, said crosshead supporting means including at least one column, a mold table supported between said bed and said crosshead, a mold for containing refractory material and supported by said mold table, a pair of plunger assemblies, each including a plurality of spaced generally parallel plungers, one of said plunger assemblies supported by said crosshead and the other of said plunger assemblies supported by said bed, means for supporting said plungers of one of said plunger assemblies in spaced relation from said crosshead, said plunger supporting means including at least one removable shim and means for releaseably clamping said shim between said plungers and said crosshead, said shim being selectively removeable whereby the spacing of said plungers from said crosshead can be varied and means for supporting said plungers of the other of said plunger assemblies in spaced relation from said bed and including at least one removable shim and means for releaseably clamping said shim between said plungers of said other of said plunger assemblies and said bed, said shim being selectively removeable whereby the spacing between said plungers of the other of said plunger assemblies and said bed can be varied.

9. Apparatus as set forth in claim 8 wherein said plungers of one of said plunger assemblies are in longitudinal alignment with said plungers of the other of said plunger assemblies.

10. Apparatus as set forth in claim 8 wherein said plunger assemblies each include a plunger mounting plate, said plungers being secured to said plunger mounting plates, and wherein said means for removably supporting said shim between said plungers and said bed includes at least one tie rod releaseably clamping said shim between said plunger mounting plate of said other of said plunger assemblies and said bed, and wherein said means for removably supporting said shim between said plungers and said crosshead includes at least one tie rod releaseably clamping said shim between said plunger mounting plate of said one of said plunger assemblies and said crosshead.

11. Apparatus as set forth in claim 10 wherein said one of said plunger assemblies further includes a base plate secured to said crosshead and including a groove therein, said groove including a shoulder, and wherein said tie rod includes an end slidably positioned in said groove, and an opposite end releaseably engaging said plunger mounting plate.

12. Apparatus as set forth in claims 11 wherein said means for supporting said plungers of said one of said plunger assemblies include a plurality of shims in vertically stacked relation, said shims each comprising a planar metal plate and being releaseably clamped between said plunger mounting plate and said base plate.

* * * * *